(12) United States Patent
McCully (10) Patent No.: US 10,078,665 B2
(45) Date of Patent: Sep. 18, 2018

(54) CUSTOMIZED RETRIEVAL AND PRESENTATION OF INFORMATION FROM A DATABASE

(75) Inventor: Eric McCully, Gloucester (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2720 days.

(21) Appl. No.: 11/678,607

(22) Filed: Feb. 25, 2007

(65) Prior Publication Data
US 2007/0203915 A1 Aug. 30, 2007

Related U.S. Application Data

(63) Continuation of application No. 09/517,505, filed on Mar. 2, 2000, now abandoned.

(30) Foreign Application Priority Data

Mar. 2, 1999 (CA) .................................... 2264321

(51) Int. Cl.
*G06F 17/30* (2006.01)

(52) U.S. Cl.
CPC ............................ *G06F 17/30474* (2013.01)

(58) Field of Classification Search
CPC ................................. G06F 17/30; G06F 17/00
See application file for complete search history.

(56) References Cited

U.S. PATENT DOCUMENTS

| 4,989,144 | A | * | 1/1991 | Barnett, III ..................... 705/29 |
| 5,265,247 | A | * | 11/1993 | Wienck et al. |
| 5,324,538 | A | | 6/1994 | Takahashi et al. |
| 5,721,903 | A | * | 2/1998 | Anand et al. ..................... 707/5 |
| 5,737,592 | A | | 4/1998 | Nguyen et al. |
| 5,740,427 | A | | 4/1998 | Stoller |
| 5,761,650 | A | * | 6/1998 | Munsil et al. .................. 705/34 |
| 5,778,357 | A | * | 7/1998 | Kolton et al. ................. 707/603 |
| 5,802,493 | A | * | 9/1998 | Sheflott et al. ................ 705/1.1 |
| 6,199,070 | B1 | * | 3/2001 | Polo-Wood et al. |

(Continued)

FOREIGN PATENT DOCUMENTS

CA 2 264 321 A1 9/2000

OTHER PUBLICATIONS

Office Action dated Dec. 17, 2001, issued in EP Application No. 00 301 717.5-2201 (3 pages).

(Continued)

*Primary Examiner* — Farhan Syed
(74) *Attorney, Agent, or Firm* — Patterson + Sheridan, LLP (57) ABSTRACT

A new method of customized retrieval and presentation of information from a relational database is disclosed. The customization is achieved by modifying a first application for retrieval and presentation of information from a database in accordance with input provided by the user, at the time when the execution of the first application is requested by the user. The user input is solicited and gathered by a second application associated with the first application. After the user input is completed, the second application generates a script which modifies the first application. The modified first application is then executed and the requested information is retrieved and presented to the user in the form customized by the user input.

19 Claims, 5 Drawing Sheets

(56) References Cited

U.S. PATENT DOCUMENTS

| | | | |
|---|---|---|---|
| 6,314,556 B1 * | 11/2001 | DeBusk et al. | 717/107 |
| 6,324,538 B1 | 11/2001 | Wesinger, Jr. et al. | |
| 6,368,177 B1 * | 4/2002 | Gabai et al. | 446/404 |
| 6,662,358 B1 * | 12/2003 | Berry et al. | 717/128 |
| 7,225,249 B1 * | 5/2007 | Barry et al. | 709/227 |
| 8,073,777 B2 * | 12/2011 | Barry et al. | 705/50 |
| 2005/0216421 A1 * | 9/2005 | Barry et al. | 705/64 |
| 2007/0203915 A1 | 8/2007 | McCully | |

OTHER PUBLICATIONS

Office Action dated Aug. 2, 2005, issued in EP Application No. 00 301 717.5-1527 (4 pages).
European Foreign Associate Letter dated Feb. 10, 2006 with attachment (20 pages).

* cited by examiner

CUSTOMIZED RETRIEVAL AND PRESENTATION OF INFORMATION FROM A DATABASE

This application claims priority under 35 U.S.C. § 119 to an application entitled "METHOD AND APPARATUS FOR GENERATING REPORTS" filed in the Canadian Patent Office on Mar. 2, 1999, and assigned Serial No. 2,264,321, the entire contents of which are expressly incorporated herein by reference; and this application further claims priority as a Continuation Application under 35 U.S.C. § 120 to U.S. Non-provisional Patent Application entitled "CUSTOMIZED RETRIEVAL AND PRESENTATION OF INFORMATION FROM A DATABASE", filed in the U.S. Patent and Trademark Office on Mar. 2, 2000, and assigned Ser. No. 09/517,505, the entire contents of which are expressly incorporated herein by reference.

FIELD OF INVENTION

The present invention relates to retrieval and presentation of information from a database. More particularly, the present invention relates to a method and apparatus for customized retrieval and presentation of information from a relational database interfaced to a TCP/IP network.

BACKGROUND OF THE INVENTION

An explosive growth and increasing popularity of digital communication networks have changed the manner in which information is accessed, exchanged and disseminated. Among various digital communication networks, both private and public, the Internet has become by far the most popular one. Through its open (non-proprietary) communication protocols and architecture, this network has attracted a large number of users. Through a variety of physical links, from satellite links to residential telephone lines, the Internet has become a truly global phenomenon.

From its inception, the Internet supported a number of protocols for communication and exchange of information, such as electronic mail (e-mail), file transfer (ftp), and direct connection to a remote computer to access its resources (telnet), with some other protocols, most notably HTTP, added later on. In the last few years, the HTTP protocol has become the most popular communication protocol used on the Internet. The worldwide network of computers connected to the Internet and using HTTP as the communication protocol is known as the World Wide Web (WWW) or simply the Web.

The popularity of the Internet and its protocols resulted in development of private networks using Transmission Control Protocol/Internet Protocol (TCP/IP) and HyperText Transfer Protocol (HTTP) as their communication standards. These networks, known as intranets, are usually set up by companies, corporations, or similar organizations, to facilitate the exchange of information and communication between the members of the organization. They cover a broad spectrum of sizes, from small in-house (office) networks to networks spanning the globe. The use of Internet communication protocols by intranets facilitates their communications with other IP networks, in particular with the Internet.

The development of the World Wide Web resulted in large amounts of data made available at various Web sites, frequently in the form of searchable databases, a phenomenon known as database publishing. Many of these databases are available to the public and contain public domain information, such as library catalogues or patent specifications. Commercial (access-for-fee) databases, which may contain proprietary information or public domain information with some value-added features, or databases containing a proprietary information belonging to corporations or other private organisms, may be also accessible through the Web, but access to these databases is usually limited to authorized users and is password-protected. Similar access limitations may also apply to internal databases accessible only to employees of an organization through a private network, in particular an intranet, and are normally used to set various levels of access to information retrievable from the database (access privileges). For both public and private (internal) databases interfaced to TCP/IP networks, there is a growing trend to provide a Web-compatible user interface for retrieving information from the database, usually with a Web browser as the only tool necessary to access the database.

The retrieval of information from a database normally requires that the information retrieved be presented in a form meaningful to the user. An example of such a meaningful form is a report, an organized presentation of certain information available in one or more databases. A report may include lists of figures, tables, graphs, charts, and the like. In a managed reporting environment, usually under control of a database management system (DBMS), the user is provided with access to a set of predefined reports stored in another database. Each predefined report specification stored in such a database represents a set of instructions (software code) capable of retrieving data from one or more databases and presenting it in the form of a report. When the user requests a report, usually by selecting it from a list of available reports, the code of the corresponding report specification is executed and the report is presented to the user as a result.

At the heart of any managed reporting environment there is a report server, a computer running a program (software code) providing a user interface, receiving input from the user requesting a specific predefined report, finding the predefined report specification in a database of such specifications, running the predefined report specification (including retrieving appropriate information from one or more databases), generating a report, and sending the report to the user interface. The managed reporting environment may serve additional functions, such as controlling access to certain report specifications, i.e., providing a predefined set of users with access to only a subset of available report specifications.

Known managed reporting environments thus require that the user select a predefined report specification. However, an acceptable predefined report specification meeting specific information requirements of the user may not be available in the system. It is often difficult, especially for a large number of database users, such as in the context of a large organization, to maintain a sufficient number of report specifications to meet all, or even most, of the users' needs. For example, a database may include sales figures for 100 different products in 100 different countries whereas the user may require a report including sales figures for only 10 specific products in 10 specific countries. The user will likely be unable to locate a report specification providing the desired combination of products and countries, since such a report would be only one out of an extremely large number of possible reports that users might require.

One approach to overcome this problem is to use a prompting predefined report specification, sometimes referred to as a "prompted report". After a prompting predefined report specification is selected by the user and executed, it prompts the user to provide certain additional information. For example, if a prompting predefined report specification has been designed to generate a report including sales figures for a set of specific products in a set of specific countries, it would prompt the user to select one or more countries from a list of countries, and to select one or more products from a list of products. Once the requested information has been supplied by the user in response to the prompts, the report server runs the prompting predefined report specification and provides a report containing information depending on user input. Prompting predefined report specifications thus use a limited form of information filtering to enable the managed reporting environment to provide a greater variety of reports. However, since prompting predefined report specifications offer only limited customization, the user may be still unable to obtain the desired report specification matching his specific needs. As the prompts of a prompting report are hard-coded, i.e., constitute part of the code of the predefined report specification, they cannot be changed without recoding the specification or at least parts thereof, which constitutes another important limitation of prompting predefined report specifications.

Another possible approach to obtain a desired report specification unavailable as a predefined report specification or prompting predefined report specification would be to modify one of the available report specifications capable of providing a report similar to that desired by the user. However, known methods of modifying a report specification require modification of the code of the specification. Most users of managed reporting environments do not have sufficient skills, knowledge, or time to locate the relevant part of the specification code and make necessary modifications, or to code an entirely new report specification. Direct modification of the code of a predefined report specification might be acceptable for frequent and skilled users, but would be impractical if not impossible for most users of the managed reporting environment.

The problem of generating customized report specifications, i.e., specifications suiting specific needs and requirements of the database user, illustrates a more general problem of customized retrieval and presentation of information available in a database. There clearly exists a need to provide a simple and flexible method for achieving a customized retrieval and presentation of information from databases, in particular relational databases. The present invention provides such a method, which is free of many prior art limitations.

SUMMARY OF THE INVENTION

In its broad aspect, the present invention provides a method of customized retrieval and presentation of information from a relational database. This is achieved by modifying in accordance with input provided by the user a first application for retrieval and presentation of information from a database, at the time when the execution of the first application is requested by the user. The user input is solicited and gathered by a second application associated with the first application. After the user input is completed, the second application generates a script which modifies the code of the first application. The modified code of the first application is then executed and the requested information is retrieved and presented to the user in the form customized by the user input.

An important feature of the method according to the present invention is that the first application is modified dynamically (at the runtime) and temporarily, without introducing any permanent changes into the original code of the first application. The same first application may be customized in different manners by different users, by association with different second applications. Similarly, the second application may be associated with different first applications for the purpose of customized information filtering and formatting.

This approach considerably simplifies and makes much more flexible the process of customized retrieval and presentation of information from a database, as compared with methods that require a complete or partial recoding of the first application to achieve the desired customization. This approach also considerably reduces the number of first applications which have to be stored in the system to achieve the retrieval and presentation of information suiting specific needs of a large number of users. By using suitable rapid application development tools, this approach also puts the creation of applications customizing information retrieval and presentation within reach of a greater number of database users.

Thus, according to one aspect of the invention, there is provided a method for customized retrieval and presentation of information from a database, the method comprising the steps of: providing a first application for retrieval and presentation of information from the database; running a second application associated with the first application, to solicit and gather user input; modifying the first application, to customize it in accordance with the user input; and running the customized first application, to retrieve and present to the user information from the database.

According to another aspect of the invention, there is provided a system for customized retrieval and presentation of information from a database, the system comprising: means for providing a first application for retrieval and presentation of information from the database; means for running a second application associated with the first application, to solicit and gather user input; means for modifying the first application, to customize it in accordance with the user input; and means for running the customized first application, to retrieve and present to the user information from the database.

According to another aspect of the invention, there is provided a method for generating a customized report specification, the method comprising the steps of: receiving user input; generating script corresponding to the user input; and applying the script to the predefined report specification to create a customized report specification.

According to another aspect of the invention, there is provided a method for generating a report, the method comprising the steps of: receiving user input; generating script corresponding to the user input; applying the script to a predefined report specification to create a customized report specification; running the customized report specification to generate a report, including retrieving appropriate information from at least one database; and outputting the report.

According to another aspect of the invention, there is provided an apparatus for generating a report, the apparatus comprising: a user interface for receiving user input; a script generating server for: prompting for further user input; generating script corresponding to the further user input; a first database comprising predefined report specifications; a second database comprising information for incorporation into reports; a report server for: finding in the first database a predefined report specification corresponding to the user input; loading the predefined report specification; applying the script to the predefined report specification to create a customized report specification; running the customized report specification, including retrieving appropriate information from the second database to generate a report; and means for outputting the report to the user interface.

According to another aspect of the invention, there is provided an apparatus for generating a report, the apparatus comprising: means for receiving user input; means for: prompting for further user input; generating script corresponding to the further user input; a first database comprising predefined report specifications; a second database comprising information for incorporation into reports; means for: finding in the first database a predefined report specification corresponding to the user input; loading the predefined report specification; applying the script to the predefined report specification to create a customized report specification; running the customized report specification, including retrieving appropriate information from the second database to generate a report; and means for outputting the report.

Other advantages, objects and features of the present invention will be readily apparent to those skilled in the art from the following detailed description of preferred embodiments in conjunction with the accompanying drawings and claims.

BRIEF DESCRIPTION OF THE DRAWINGS

The embodiments of the invention will now be described with reference to the accompanying drawings, in which.

DETAILED DESCRIPTION OF THE PREFERRED EMBODIMENTS

In the absence of an explicit statement to the contrary, the term "database" as used herein refers to one or more databases from which information may be retrieved and presented to the user. The term "report specification" as used herein refers to an application for retrieving information from a database and presenting it in the form of a report to the user. The term "application" refers to a program or group of programs designed for end users of a database management system.

For the sake of clarity and better understanding, the present invention will be described in the context of a managed reporting environment generating customized reports for users of a database. Those skilled in the art will appreciate that the present invention is not limited to managed reporting environments, but may be applied to other environments and forms of retrieval and presentation of information from a database.

Figure 1:
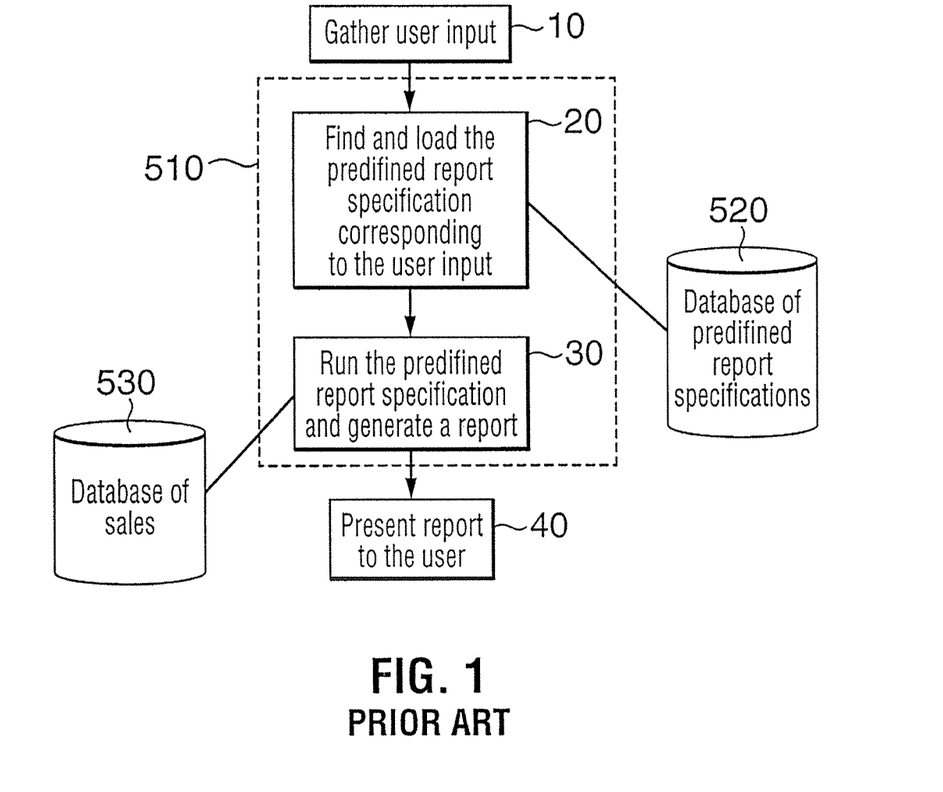
FIG. 1 is a flowchart illustrating the prior art method of generating report from a predefined report specification.

Turning now to the figures, FIG. 1 shows a flowchart illustrating how reports are generated in a typical prior art managed reporting environment. In the first step 10, input is gathered by the system from the user. Some of the input may be gathered directly from the user's computer, without the user taking any action. Examples of such input would be the time zone in which the user's computer is operating, user's language, country, and the type of browser used. Other input is provided by the user through a user interface. Examples of such input would be the user's password and the specific report selected by the user, for example from a list of available reports. The report so selected will normally correspond to an available predefined report specification.

In step 20, a report server 510 receives the user input. The report server 510 finds and loads from a database 520 of predefined report specifications the specific predefined report specification corresponding to the report requested by the user. In step 30, the report server 510 runs the predefined report specification, including retrieving appropriate information from a database 530, such as a database of a company sales, to generate a report. In step 40, the report is presented to the user at the user interface. The report may be in any of a number of formats, such as html, pdf, xml, printed, and the like.

In the prior art managed reporting environment presented above, there is little or no opportunity for the user to customize the report, and the user's input is usually limited to selecting a predetermined report or a prompting predetermined report from among those available in the system. For a prompting report, limited opportunities to filter the information retrieved and to customize the report are provided to the user. The present invention makes the process of customization easier and more flexible.

Figure 2:
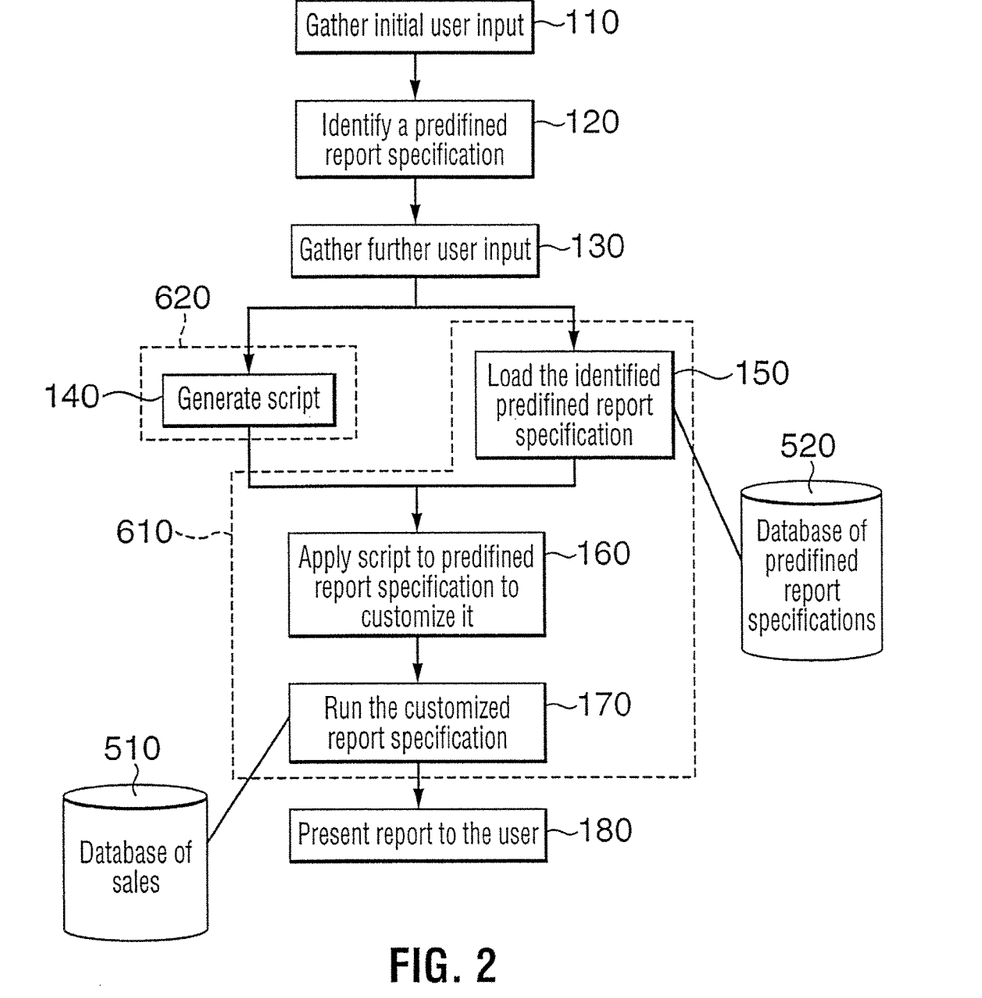
FIG. 2 is a flowchart illustrating the method of generating report from a predefined report specification in accordance with the present invention.

The generation of a customized report according to the present invention is shown schematically in FIG. 2, which is a flowchart illustrating how reports are generated on a managed reporting environment according to the present invention. In step 110, initial input is gathered from the user. Similarly as in the prior art reporting environment, some input may be gathered directly from the user's computer, without any action taken by the user.

Other input, such as the user's password and the required report, is provided by the user through a user interface. After the report requested by the user has been identified in step 120, further user input is gathered in step 130 by a script generating server 620, which prompts the user for information about changes the user wants to make to the selected report. Based on the user input gathered in step 130, a script is generated in step 140 by the script generating server 620. This script is passed to the report server 610 and is applied in step 160 to the predefined report specification selected by the user, to customize it. The report specification to be customized was loaded in step 150 by the report server 610 from a database 520 of predefined report specifications. In step 170, the report server 610 runs the customized report specification, including retrieving appropriate information from one or more databases 510 containing information of interest to the user, to generate a report. In step 180 the report is output by the report server 610 to the user interface. The report may be presented to the user in any suitable format, such as html, pdf, xls, printed, and the like.

Figure 3:
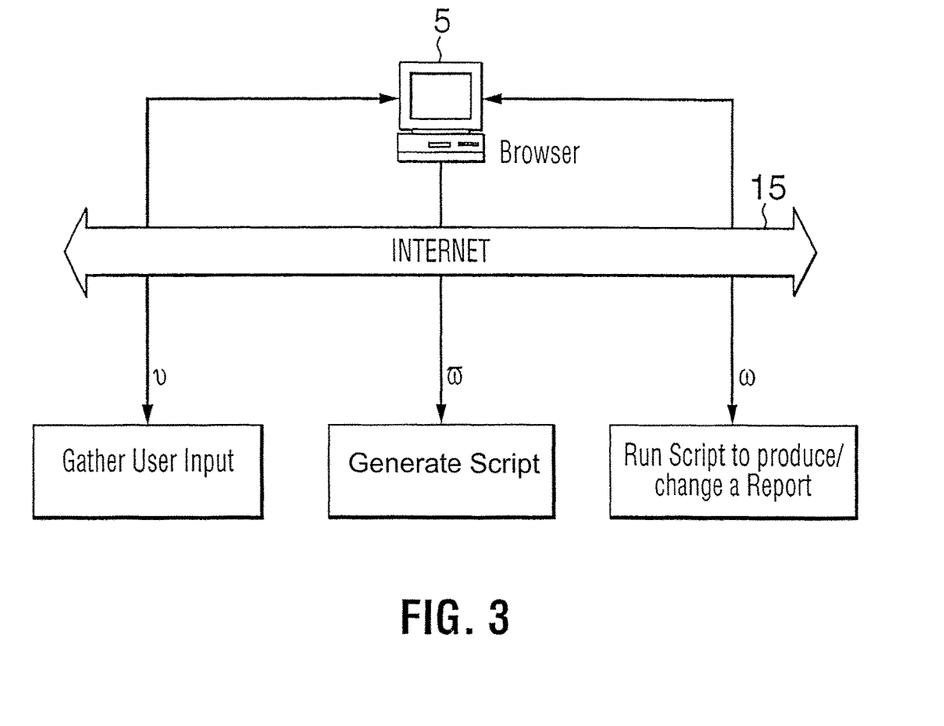
FIG. 3 is a diagram illustrating a system for generating report from a predefined report specification in accordance with the present invention.

In a preferred embodiment, the predefined report specification selected by the user is customized using an application associated with the report, which application is selected in conjunction with the report. Only one application may be associated with the report specification at the run-time, even though more than one application can be used to customize the same report. Thus, to filter the information retrievable from the database and customize a report, the user selects both a predetermined report and an application associated with a report. When running an application against a report associated therewith, the user is first presented with a series of prompts requesting an additional input, for example, by making selections among a number of available options. Based on the user input, the application generates a script in a suitable script language, such as CognosScript language, which script is applied to the predefined report specification selected by the user to modify its code and to customize the report in accordance with the user input. In some cases the modifications will be effectively equivalent to creating an entirely new report specification based on the user input. Such a modified or newly created report specification is then run against the database associated with the report, resulting in a customized report being delivered to the user. This process, as carried out in the Web-based environment, is shown schematically in FIG. 3, with a Web browser 5 as the only user interface and the Internet 15 used as the communication medium. In a preferred embodiment, the application is adapted to be run in a Web-based environment, using a Web browser as the only user interface. At its runtime, the application appears to the user as a series of HTML pages guiding the user through the modification process and prompting the user to define the content and form of the report, usually by selecting from lists of provided values and options. Instructions for navigating through the HTML pages are also included in the pages, where necessary.

In a preferred embodiment, an application used for customizing reports comprises Entry, Exit and Error pages. The Entry page starts the process of input gathering and is the first page presented to the user. The Exit page activates the script which modifies the predefined report specification selected by the user and is the last page presented to the user. The Error page is displayed only if an error occurs when the application is running, to provide an appropriate warning. No links can be made to or from the Error page. The path between the Entry and the Exit pages may contain as many additional pages as required to filter the information available in a database and to customize the report. The pages may have direct, linear links between the Entry and Exit pages, looped links that allow the user to specify a number of options, and conditional links which follow a branch of the navigational path. The latter two kinds of links, in particular, provide a substantial flexibility in filtering the available information and tailoring the report to the user's needs and requirements.

Figure 4:
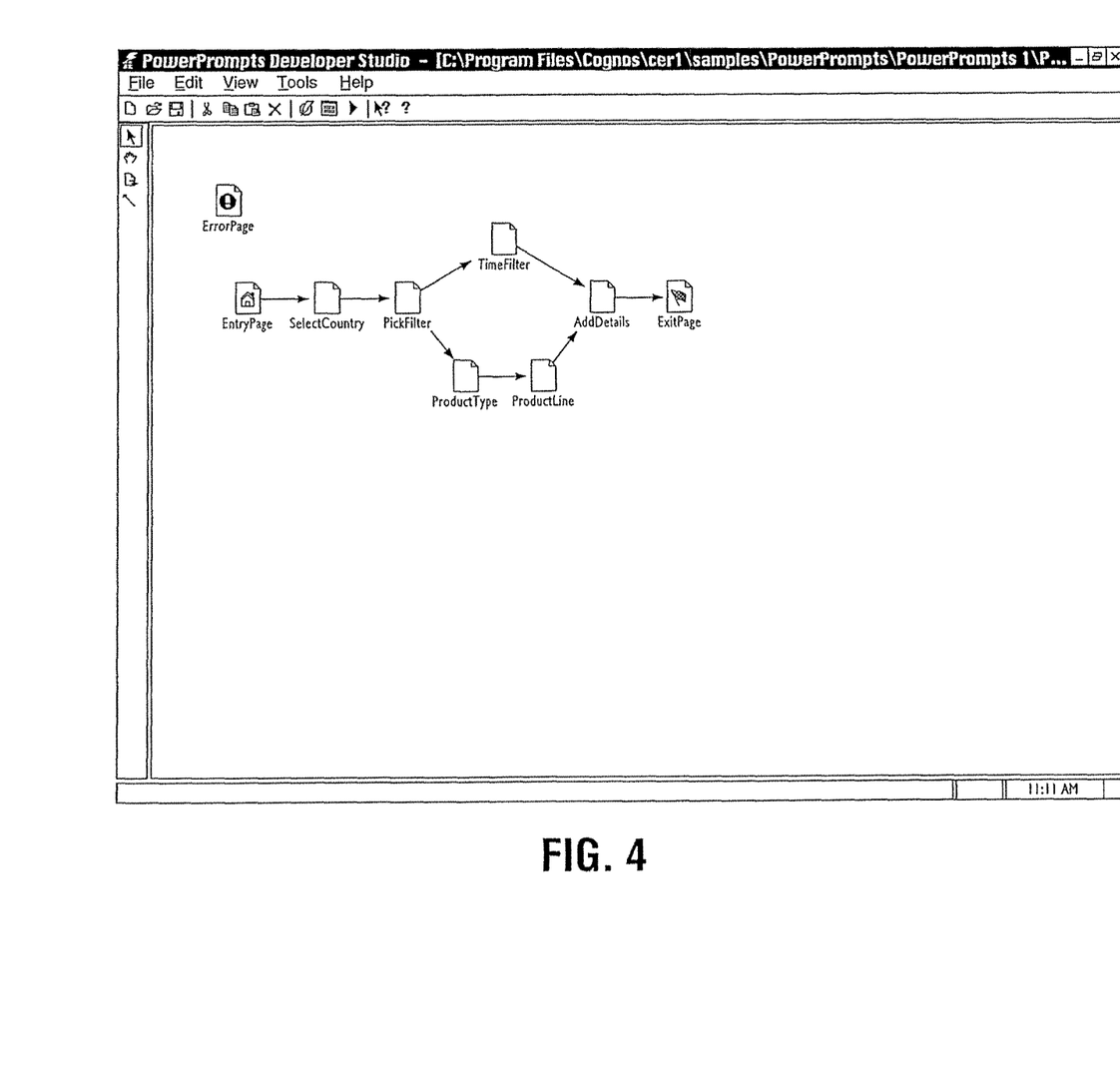
FIG. 4 is a screen capture showing the main screen of a rapid application development tool for creating report customizing applications in accordance with the present invention.

As the HTML pages of the customizing application are simple text files, they can be created and formatted using an HTML editor or even a word processor. However, the process of creating an application to customize a report can be substantially simplified by using a suitable rapid application development (RAD) tool, such as the PowerPrompts Developer Studio for Impromptu Web Reports (from Cognos Incorporated) running under Windows operating system. FIG. 4 shows the main screen of the PowerPrompts Developer Studio, providing a workspace in which an application can be created or edited in a graphic environment. Each named icon appearing in the workspace represents an HTML page of the customizing application being created or edited, with arrows showing the navigational path between its pages. Opening a new application in the Developer Studio results in icons of the Entry, Exit and Error pages being inserted into the workspace, with a direct navigational path between the Entry and Exit pages. Additional pages and navigational paths therebetween may be added to the workspace using suitable tools provided on the tool bar.

Inserting a page icon into the workspace results in an automatic creation of a corresponding HTML page based either on a created in advance template (for the Entry page and all additional pages) or a default HTML code (for the Exit and Error pages). All pages of the application may be edited and formatted with regular HTML codes and may contain any formatting which can be created using HTML. The editing of HTML pages is carried out with an HTML editor, such as Microsoft FrontPage or Netscape Composer, or a text editor, such as Notepad. The editor must be specified to the PowerPrompts Developer Studio before it can be used from within this application.

Other than the formatting HTML code, the HTML pages of the customizing application contain HTML code required to present the user with suitable prompts and to collect the correct data. This normally requires adding to the pages a code for various HTML controls which will be offered to the user and a code defining navigational paths between the pages.

The navigational path through the pages is created by defining conditions for links between the pages of the application, in particular for pages linked to more than one other page, which conditions are evaluated at the runtime of the application and result in selection of links having conditions evaluated as "true". For some HTML controls, such as drop down lists, dynamos may be created for retrieval of the actual lists of values from the database at the application runtime, in which case the corresponding HTML code for running the dynamos is added to HTML pages containing these controls.

Finally, to complete the application, scripts implementing the selections made by the user must be created and added thereto. Each script is associated with a condition which conditions, in turn, are associated with selections made by the user when responding to prompts. The value of the condition at the runtime determines whether the script will be run against the report or which value will be filtered in the report. For some scripts, the value will be inserted in the script from the user selections, such as selecting a country or product. For others, the script will run only if the condition is met, such as when adding a column or filtering by a year or quarter. Each script uses a method or a number of methods.

All the above tasks may be accomplished using facilities provided by the PowerPrompts Developer Studio. These facilities, customary for applications running under Windows operating system, are well known to those skilled in the art and include toolbars, dialog boxes, wizards, managers, etc., either present on the main screen or activated from various drop-down or pop-up menus. A complete customized application, consisting of an application file (containing instructions for navigating through the HTML pages, the conditions and any scripts associated therewith), the associated HTML files, and any graphic files used for formatting the HTML pages, is then associated with a report and entered in a managed reporting environment. When users access a report with an application associated therewith, the application runs in the users' Web browser and they are prompted for information about what they want to see in the report.

Figure 5:
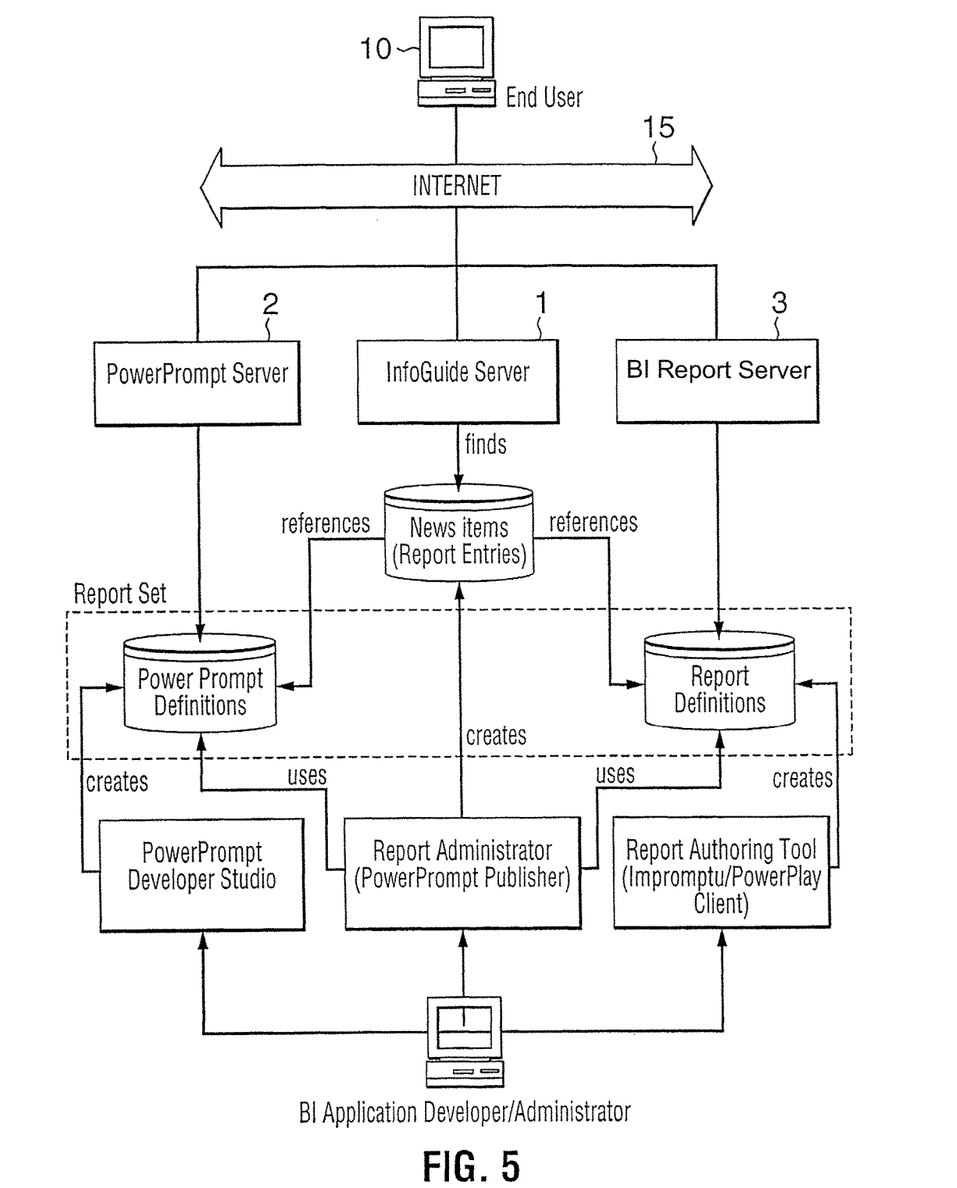
FIG. 5 is an architectural overview showing interaction of a report customizing application in accordance with the present invention with a managed reporting environment.

The method of customized retrieval and presentation of information according to the present invention may be added to existing managed reporting environments. An example of such a managed reporting environment is Impromptu Web Reports (IWR) from Cognos Incorporated, which is a Web-based system for accessing reports through a Web browser. FIG. 5 provides an architectural overview of the system. An application embodying the present invention interacts with the IWR reporting components in the following manner. Using a Web browser, the end-user 10 accesses through the Internet 15 the InfoGuide Server 1, to locate a specific report to be run. If an application according to the present invention is associated with the located report, instead of handing off the located report to an appropriate reporting server for immediate execution, as would be the case in a prior art system, control is passed to the PowerPrompt Server 2. This script generating server then interacts with the end-user 10 through a series of screens to determine changes the end-user 10 wants to make to the report before running it. The changes are described in the form of a script generated by the PowerPrompt Server 2 after the user input is completed, which script is packaged up and handed off to the Business Intelligence (BI) Report Server 3 as part of the request to run the report. It is the Report Server's 3 responsibility to act on the script generated by the PowerPrompt Server 2 by modifying the code of the report specification in accordance with the script, to execute the modified code, generate the report, and send it to the end-user 10.

When used in a managed reporting environment, the present invention allows to considerably reduce the number of predefined report specifications maintained in the system. A customizing application associated with a predefined report specification is effectively equivalent to a large number of predefined report specifications which otherwise would have to be coded in advance and stored in the system to provide the same flexibility of information retrieval and presentation. Importantly, the user does not need to know how to modify the code of the selected predefined report specification. The user is only required to respond to certain prompts, normally using a point-and-click interface, and the application adds further criteria restricting the data retrieval to those already in place. In this fashion, complex reports may be generated from relatively simple predefined report specifications, by incorporating the prompted user input. This is not possible in a managed reporting environment using predefined report specifications coded in advance, which code can only be modified manually.

Running a customizing application according to the present invention results in a set of instructions modifying an existing report specification. Such an existing report specification may have been created only in part or may be even empty. If the existing report specification is quite complete and presents a large amount of information in a very specific manner, for example to convey an understanding of the subject matter of the report, only few modifications may be available to the user. In the other extreme, the user may want to build almost entire report specification. In this case an empty report specification can be modified and an application embodying the present invention creates all the script, with a very substantial input from the user. This approach would be rather unusual, as requiring a lot of work from the application developer and user, with the user being in a better position as only required to respond to a potentially large number of easy to understand prompts. In typical cases, however, most of the report specification will already be written, with a relatively small amount of input left to the user.

Known managed reporting environments are based on a hard coded logic, not a generic mechanism to build up code. In a prompted report specification, which shows certain superficial similarity to the present invention, the code of the selected predefined report specification is incomplete until certain values are provided by the user and inserted into the code without any direct user's intervention. According to the present invention, a predefined report specification is also selected. However, external to the report specification, an application generates a script that will actually modify the code of the report specification. The modification is temporary and dynamic, i.e., taking place at the runtime of the report specification. The same report specification may be modified by different users using different customizing applications.

In known managed reporting environments, the report server retrieves a report specification and then uses it to generate a report. In a managed reporting environment embodying the present invention, the report specification is retrieved and modified, based on the received user's input, by another server and then handed off to the report server, to be run and generate the report. This process is transparent to the user, who never leaves the Web browser, the only tool required to communicate with the system and receiving the report.

In the foregoing, the invention has been described in the context of managed reporting environments and generation of customized reports. However, the present invention provides a much more powerful and general method of customized retrieval and presentation of information from a relational database, which method may be applied to tasks other than generating a customized report. An example of such a task would be the generation of a multidimensional database (MDDB), also known as a cube, an increasingly popular model for data retrieved from a data warehouse.

While the present invention has been described in connection with what is presently considered to be the most practical and preferred embodiments, it is to be understood that the invention is not limited to the disclosed embodiments. To the contrary, the present invention is intended to cover various modifications and equivalent arrangements included within the spirit and the scope of the appended claims. The scope of the appended claims is to be accorded the broadest interpretation so as to encompass all such modifications and equivalent structures and functions.

All United States patents and applications, foreign patents, and publications discussed above are hereby incorporated herein by reference in their entireties.

What is claimed is:
1. An apparatus for generating a report, comprising:
  a. one or more server systems, each having at least a processor and a memory storing one or more applications, executed on the processor to generate the report by:
    i. providing a user interface configured to receive user input indicating a selection of a predefined report specification, the predefined report specification comprising code configured to retrieve information from a database and present a report of the retrieved information;
    ii. prompting, via the user interface, for further user input, wherein the further user input specifies one or more modifications for the report generated by the predefined report specification;
    iii. generating a script corresponding to the further user input, wherein the script is configured to modify the code of the predefined report specification;
  b. a first database comprising predefined report specifications;
  c. a second database comprising information for incorporation into reports;
  d. wherein the one or more server systems further generate the report by:

i. finding, in the first database, the predefined report specification corresponding to the user input;
ii. loading the predefined report specification;
iii. applying the script to modify the predefined report specification to create a customized report specification by modifying the code of to the predefined report specification based on the further user input;
iv. running the customized report specification, including retrieving appropriate information from the second database to generate a customized report; and
v. outputting the report to the user interface.

2. The apparatus according to claim 1, wherein the script is applied to the predefined report specification after gathering of the further user input is completed.

3. The apparatus according to claim 2, wherein the script modifies the code of the predefined report specification.

4. The apparatus according to claim 3, wherein the code is modified at the runtime of the predefined report specification.

5. The apparatus according to claim 4, wherein the predefined report specification and the second application are adapted for running in a Web-based environment.

6. The apparatus according to claim 5, wherein the second application comprises at least one HTML page for soliciting and gathering the further user input.

7. The apparatus according to claim 6, wherein the second application comprises a plurality of HTML pages.

8. The apparatus according to claim 7, wherein the user navigates through the HTML pages to provide the further user input.

9. The apparatus according to claim 1, wherein the report is presented to the user as a cube.

10. A method for generating a report, the method comprising:
a. at a server,
   i. receiving user input indicating a selection of a predefined report specification, the predefined report specification comprising code configured to retrieve information from a database and present a report of the retrieved information;
   ii. prompting for further user input, via the user interface, for further user input, wherein the further user input specifies one or more modifications for the report generated by the predefined report specification;
   iii. generating a script corresponding to the further user input, wherein the script is configured to modify the code of the predefined report specification;
   iv. finding in a first database a predefined report specification corresponding to the user input;
   v. loading the predefined report specification;
   vi. applying the script to modify the predefined report specification to create a customized report specification by modifying the code of the predefined report specification based on the further user input;
   vii. running the customized report specification, including retrieving appropriate information from a second database which comprises information for incorporation into reports to generate a customized report; and
   viii. outputting the report to the user interface.

11. The method according to claim 10, wherein the script is applied to the predefined report specification after gathering of the further user input is completed.

12. The method according to claim 11, wherein the script modifies the code of the predefined report specification.

13. The method according to claim 12, wherein the code is modified at the runtime of the predefined report specification.

14. The method according to claim 13, wherein the predefined report specification and the second application are adapted for running in a Web-based environment.

15. The method according to claim 14, wherein the second application comprises at least one HTML page for soliciting and gathering the further user input.

16. The method according to claim 15, wherein the second application comprises a plurality of HTML pages.

17. The method according to claim 16, wherein the user navigates through the HTML pages to provide the further user input.

18. The method according to claim 10, wherein the outputting step includes presenting the report to the user as a cube.

19. The method according to claim 10, wherein the outputting step includes presenting a report to a system as a cache for the purpose of it to be used by the system, an application, any other process within or outside of the application, or user.

* * * * *